(12) United States Patent  (10) Patent No.: US 9,361,625 B2
Parker et al.  (45) Date of Patent: Jun. 7, 2016

(54) GAME NAVIGATION INTERFACE FOR ELECTRONIC CONTENT

(75) Inventors: Samuel Parker, San Francisco, CA (US); Douglas Schmidt, Huntington, NY (US); Steve Snyder, Redwood City, CA (US)

(73) Assignee: CBS INTERACTIVE INC., New York, NY (US)

(*) Notice: Subject to any disclaimer, the term of this patent is extended or adjusted under 35 U.S.C. 154(b) by 930 days.

(21) Appl. No.: 13/180,879

(22) Filed: Jul. 12, 2011

(65) Prior Publication Data

US 2013/0017870 A1    Jan. 17, 2013

(51) Int. Cl.
*G06Q 30/02*    (2012.01)
*G06F 3/048*    (2013.01)

(52) U.S. Cl.
CPC ......... *G06Q 30/02* (2013.01); *A63F 2300/5506* (2013.01); *G06F 3/048* (2013.01)

(58) Field of Classification Search
CPC .............. G06Q 30/02; G06Q 30/0269; G06Q 30/0255; G06Q 30/0224; G06Q 30/0236; G06Q 30/0271; G06Q 30/0277; A63F 2300/5506; A63F 13/10
USPC .......................................................... 715/745
See application file for complete search history.

(56) References Cited

U.S. PATENT DOCUMENTS

| | | | | |
|---|---|---|---|---|
| 6,757,661 B1* | 6/2004 | Blaser | ..................... | G06Q 30/02 705/14.54 |
| 8,109,819 B2* | 2/2012 | Hughes | ................... | G06Q 30/02 273/430 |
| 8,190,733 B1* | 5/2012 | Hoffman | ................ | G06Q 30/00 709/203 |
| 8,202,159 B1* | 6/2012 | Ocko et al. | ....................... | 463/25 |
| 8,239,487 B1* | 8/2012 | Hoffman et al. | .............. | 709/218 |
| 8,543,925 B2* | 9/2013 | Weitz | ...................... | G06Q 10/10 715/742 |
| 8,768,764 B1* | 7/2014 | Paharia | .............. | G06Q 30/0207 705/14.1 |
| 2001/0041561 A1* | 11/2001 | Ventulett | ................ | G06Q 30/02 455/414.1 |
| 2002/0013174 A1* | 1/2002 | Murata | ........................... | 463/42 |
| 2002/0049635 A1* | 4/2002 | Mai | ..................... | G06Q 30/0269 705/14.66 |
| 2002/0112048 A1* | 8/2002 | Gruyer | .................... | G06Q 30/02 709/224 |
| 2004/0030741 A1* | 2/2004 | Wolton | ............. | G06F 17/30873 709/202 |
| 2005/0192097 A1* | 9/2005 | Farnham et al. | ................. | 463/42 |
| 2005/0262231 A1* | 11/2005 | Lowe | ................... | H04L 41/0266 709/223 |
| 2006/0068906 A1* | 3/2006 | Morrow | .............. | G07F 17/3209 463/30 |

(Continued)

*Primary Examiner* — Amy M Levy

(57) ABSTRACT

A game navigation interface for electronic content is described. A computer-implement system may comprise a content delivery platform operative to manage multimedia content. The computer-implemented system may further comprise a game navigation application operative to manage a game for the content delivery platform. The game navigation application may comprise a monitoring component operative to monitor navigation commands for navigating multimedia content provided by the content delivery platform, and output a game trigger signal based on the navigation commands. The game navigation application may further comprise a game navigation component operative to receive the game trigger signal, and select a game arranged to assist a user in navigating the multimedia content in response to the game trigger signal. Other embodiments are described and claimed.

27 Claims, 14 Drawing Sheets

(56) References Cited

U.S. PATENT DOCUMENTS

| | | | | |
|---|---|---|---|---|
| 2006/0217110 A1* | 9/2006 | Othmer | G06Q 30/02 | 455/414.1 |
| 2006/0258463 A1* | 11/2006 | Cugno | A63F 13/12 | 463/42 |
| 2007/0061412 A1* | 3/2007 | Karidi | G06F 17/3089 | 709/217 |
| 2007/0066403 A1* | 3/2007 | Conkwright | A63F 13/10 | 463/43 |
| 2007/0072678 A1* | 3/2007 | Dagres | | 463/42 |
| 2007/0112712 A1* | 5/2007 | Flinn | G06Q 30/0283 | 706/45 |
| 2008/0287190 A1* | 11/2008 | Fulton et al. | | 463/42 |
| 2008/0294997 A1* | 11/2008 | Weitz et al. | | 715/742 |
| 2009/0006974 A1* | 1/2009 | Harinarayan | G06F 17/30867 | 715/738 |
| 2009/0017913 A1* | 1/2009 | Bell | A63F 13/12 | 463/40 |
| 2009/0234711 A1* | 9/2009 | Ramer | G06F 17/30749 | 705/14.66 |
| 2009/0240568 A1* | 9/2009 | Ramer | G06F 17/30749 | 705/14.49 |
| 2010/0041958 A1* | 2/2010 | Leuthardt | G06F 19/3481 | 600/300 |
| 2010/0063877 A1* | 3/2010 | Soroca | G06F 17/30749 | 705/14.45 |
| 2010/0069148 A1* | 3/2010 | Cargill | G07F 17/3255 | 463/25 |
| 2010/0094878 A1* | 4/2010 | Soroca | G06F 17/30035 | 707/748 |
| 2010/0227691 A1* | 9/2010 | Karsten | G07F 17/32 | 463/42 |
| 2010/0228617 A1* | 9/2010 | Ransom | G06Q 30/02 | 705/14.25 |
| 2011/0258049 A1* | 10/2011 | Ramer | G06F 17/30867 | 705/14.66 |
| 2011/0276396 A1* | 11/2011 | Rathod | G06F 17/30867 | 705/14.49 |
| 2012/0015724 A1* | 1/2012 | Ocko | A63F 13/10 | 463/31 |
| 2012/0202600 A1* | 8/2012 | Jalili | | 463/42 |
| 2012/0214568 A1* | 8/2012 | Herrmann | H04L 67/22 | 463/16 |
| 2012/0245715 A1* | 9/2012 | Short | | 700/91 |
| 2012/0271805 A1* | 10/2012 | Holenstein | G06F 17/30876 | 707/706 |

* cited by examiner

200

- MONITOR NAVIGATION COMMANDS FOR MULTIMEDIA CONTENT PROVIDED BY A CONTENT DELIVERY PLATFORM
  *202*

- SELECT A GAME FOR THE CONTENT DELIVERY PLATFORM BASED ON THE NAVIGATION COMMANDS
  *204*

- SELECT A GAME OBJECTIVE FOR THE GAME
  *206*

- GENERATE MULTIMEDIA CONTENT WITH THE GAME OBJECTIVE FOR A USER INTERFACE VIEW FOR PRESENTATION ON A DISPLAY
  *208*

MONITOR NAVIGATION COMMANDS FOR MULTIMEDIA CONTENT PROVIDED BY A CONTENT DELIVERY PLATFORM
212

COMPARE THE MONITORED NAVIGATION COMMANDS WITH A DEFINED NAVIGATION PATTERN
214

SELECT THE GAME FOR THE CONTENT DELIVERY PLATFORM WHEN THE NAVIGATION COMMANDS MATCH A DEFINED NAVIGATION PATTERN
216

MONITOR NAVIGATION COMMANDS FOR MULTIMEDIA CONTENT PROVIDED BY A CONTENT DELIVERY PLATFORM
222

SELECT A TARGET MULTIMEDIA CONTENT FOR THE CONTENT DELIVERY PLATFORM BASED ON THE NAVIGATION COMMANDS
224

SELECT THE GAME OBJECTIVE FOR THE GAME BASED ON A TARGET MULTIMEDIA CONTENT
226

*FIG. 2C*

GAME NAVIGATION INTERFACE FOR ELECTRONIC CONTENT

BACKGROUND

Online services have led to generation and storage of vast amounts of information accessible via a network. For instance, a wide array of server devices host web sites designed to present multiple web pages full of content for user consumption that may be accessed via a web browser implemented by a variety of client devices. Along with this plethora of online information comes a problem of a user locating particular information of interest. Conversely, business entities find it increasingly difficult to distinguish specific content for its web sites from among the multitude of hosted web sites, and in cases of larger web sites, particular web pages within a given web site. For instance, a single web site may contain hundreds if not thousands of web pages that are potentially accessible by a user. Drawing attention to a specific part of a web site or a given web page becomes a challenge. Meanwhile, constantly providing traditional navigation prompts, advertisements, and other marketing tools in persistent attempts to draw user attention quickly become tedious for a user, thereby reducing a quality of user experience when surfing a web site. As a result, a user may prematurely leave a web site or a web page without taking advantage of the full array of content and services provided by each. As such, a new navigation paradigm is needed to assist users in navigating online content. It is with respect to these and other considerations that the present improvements have been needed.

BRIEF DESCRIPTION OF THE DRAWINGS

FIG. 2A illustrates an embodiment of a first logic flow.

FIG. 2B illustrates an embodiment of a second logic flow.

FIG. 2C illustrates an embodiment of a third logic flow.

DETAILED DESCRIPTION

Figure 1A:
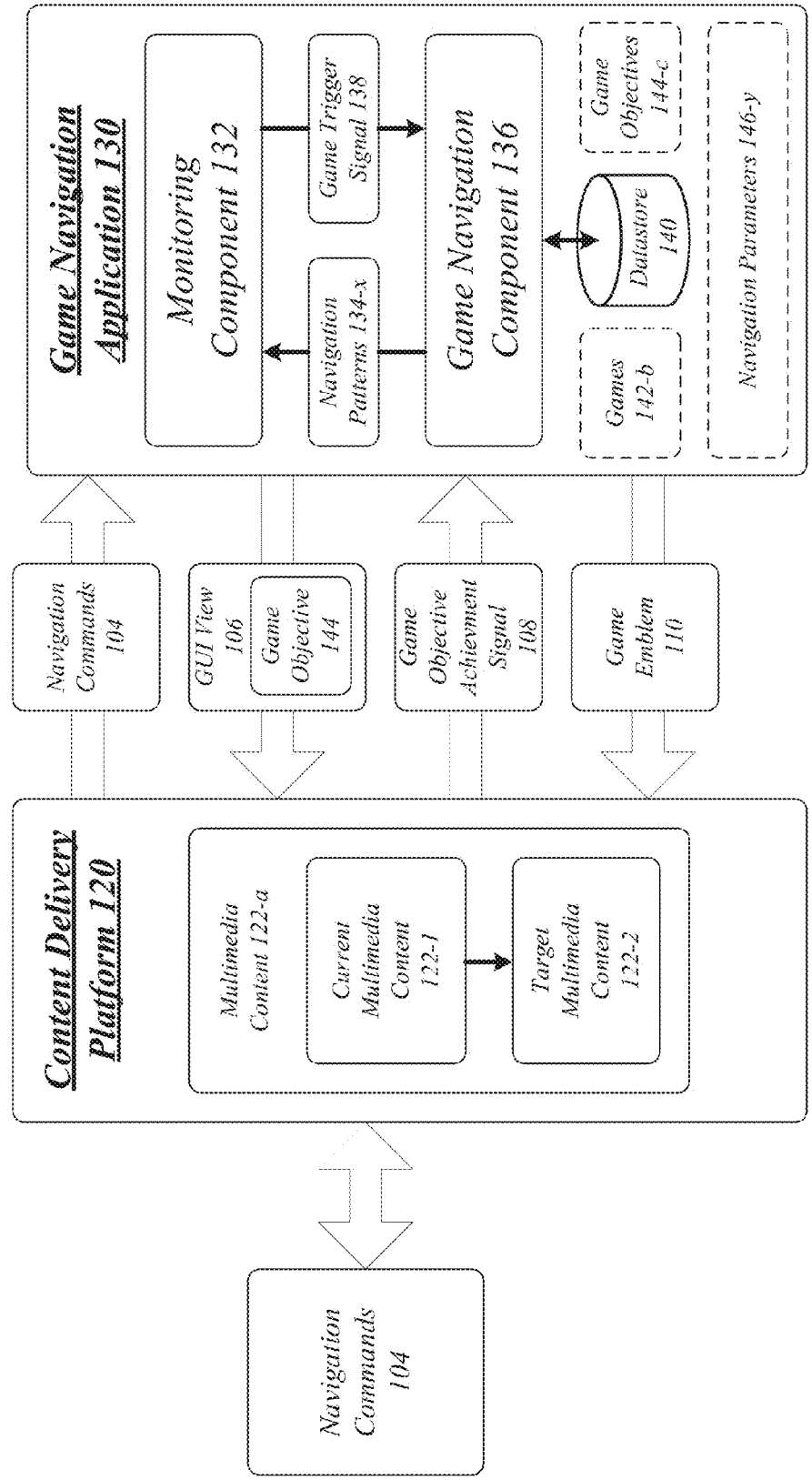
FIG. 1A illustrates an embodiment of a game navigation system.

Various embodiments are generally directed to techniques to present, navigate and access electronic content provided on a network. Some embodiments are particularly directed to a game navigation interface specifically designed to influence user behavior when navigating electronic content (e.g., a website) through gaming techniques. Games and related gaming techniques (e.g., missions, awards, and points) may be implemented to engage a user and encourage exploration and interaction with electronic content by becoming actively involved in a game specifically designed around, and integrated with, a particular set of electronic content. While a primary purpose for a game is entertainment, the game navigation interface is designed to use the entertainment aspect of gaming to shape user behavior in an incremental fashion when navigating electronic content provided by a content delivery platform. As such, the game navigation interface turns a game into a "metagame" that is used primarily as a marketing tool for different types of content provided by a content delivery platform. In this manner, a content provider may provide a superior user experience while enhancing monetization of a content delivery platform, among other advantages.

Embodiments are directed to various enhanced navigation techniques arranged to allow a user to navigate to a specific set of electronic content presented by a network. For instance, embodiments may comprise a game navigation interface arranged to implement various types of games, strategies, missions, tasks and other gaming techniques traditionally found in gaming applications to assist in navigating hosted multimedia content, such as provided by an application program, a system program, a web site, a web page, a web part, a web application, a web service, and so forth. The games may have one or more game objectives that when achieved leads a user to specific target content for a content delivery platform, such as specific portions of a web page or a web site, for example. In this manner, a game designer may design a game in a way that leads users to higher value portions of a web site, such as advertisements, marketing events, web site features (e.g., registration), and so forth. Further, a game navigation interface may cause a user to stay on a content delivery platform for a longer time period, thereby increasing "stickiness." In addition, a game navigation interface may allow a content provider to track user activity and gauge user interest or intent through game status, scoring, awards, emblems, social media comments, and so forth.

In one embodiment, a computer-implement system may comprise a content delivery platform operative to manage multimedia content. The computer-implemented system may further comprise a game navigation application operative to manage a game for the content delivery platform. The game navigation application may comprise, among other elements, a monitoring component operative to monitor navigation commands for navigating multimedia content provided by the content delivery platform, and output a game trigger signal based on the navigation commands. The game navigation application may further comprise a game navigation component operative to receive the game trigger signal, and select a game arranged to assist a user in navigating the multimedia content in response to the game trigger signal. The game may have a game objective designed to lead a user from current multimedia content to target multimedia content of the content delivery platform. The target multimedia content may comprise a higher value multimedia content relative to the current multimedia content, as measured by some form of value measurements (e.g., advertising revenue). Other embodiments are described and claimed.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1A illustrates a block diagram for a game navigation system 100. In one embodiment, the game navigation system 100 may comprise a computer-implemented game navigation system 100 having one or more software applications and/or components. Although the game navigation system 100 shown in FIG. 1A has a limited number of elements in a certain topology, it may be appreciated that the game navigation system 100 may include more or less elements in alternate topologies as desired for a given implementation.

In the embodiment shown in FIG. 1A, the game navigation system 100 may comprise or be implemented as part of a processing system, including one or more processors, memory units, and communications buses. The processing system may be implemented in different electronic devices, such as a computing device, a communications device, or a combination computing and communications device, among others. A more detailed example of a suitable computing device is provided with reference to FIG. 7.

The game navigation system 100, or portions of the game navigation system 100, may be implemented using various web technologies, such as web services and web applications, for example. In various embodiments, logic for the game navigation system 100 may be programmed in accordance with various programming languages, application platforms and application frameworks, including JAVA made by Oracle Corporation, COLDFUSION made by Adobe Systems Incorporated, .NET made by Microsoft® Corporation, WebORB for .NET, Hypertext Preprocessor (PHP), Ruby, Python, Perl, Lisp, Dylan, Pike, Cluster (CLU), Smalltalk, Eiffel, Ruby on Rails (RoR), C, C++, C#, and so forth. The logic may also comprise part of a RIA, such as a front-end of a SOA for deployment on a web browser of a client computing device using various client side technologies, such as an Adobe Flash platform programmed in an object-oriented programming language such as ACTIONSCRIPT™ and ADOBE® FLEX, made by Adobe Systems Incorporated. It may be appreciated that these programming languages are provided by way of example and not limitation. Logic for the game navigation system 100 may be implemented using any suitable programming language.

The game navigation system 100 may comprise a content delivery platform 120. The content delivery platform 120 may comprise any software program capable of managing and presenting different types of multimedia content 122-a. A content delivery platform 120 may be implemented as a client program, a server program, or some combination of client/server programs. One example of a content delivery platform 120 may comprise an application program designed to deliver content accessible over a network, such as application server software or web server software. In one embodiment, for example, a content delivery platform 120 may be implemented as web server software to manage a website comprising a collection of related web pages containing multimedia content such as text, images, videos and other digital assets. Other examples of a content delivery platform 120 may include without limitation centralized or distributed application programs, system programs, middleware programs, enterprise programs, web applications, web services, and so forth. The embodiments are not limited in this context.

A content delivery platform 120 is generally arranged to manage multimedia content 122-a. Multimedia content 122-a may comprise different types of content (e.g., text, audio, video, audio/video, images, pictures, animations, icons, user interface elements, tactile content, olfactory content, etc.) capable of presentation by a content delivery platform 120. In some cases, multimedia content 122-a may comprise different documents or other information resources capable of presentation on a display. When a content delivery platform 120 is implemented as a network application, such as web server software hosting a website, multimedia content 122-a may comprise one or more web pages accessible via a web browser. When a content delivery platform 120 is implemented as a local application, such as an application program or a system program on an electronic device, multimedia content 122-a may comprise one or more documents or user interface views accessible via a user interface for the application/system programs. The embodiments are not limited in this context.

The game navigation system 100 may comprise a game navigation application 130. The game navigation application 130 is generally arranged to manage one or more games 142-b on behalf of the content delivery platform 120. The games 142-b may comprise any electronic game that involves interaction with a user interface to generate multimedia feedback on an electronic platform, such as a computing device, video game console, handheld computer, arcade machine, and so forth. An input device (e.g., game controller, keyboard, joystick, mouse, trackball, touchpad, touchscreen, microphone, headphones, etc.) may accept control directives from a user to manipulate a game 142-b. A game 142-b may output multimedia feedback (e.g., audio, visual, audio/visual, tactile, olfactory, etc.) using one or more output devices (e.g., a display, light emitting diodes, speakers, headphones, haptic peripherals, etc.). Games 142-b may include any genre based on many factors such as game play, types of goals, art style and more, and may include without limitation graphic adventures, point-and-click adventures, text adventures, first-person adventures, first-person shooters, comic adventures, anime adventures, and so forth. It may be appreciated that any number of different games and gaming techniques may be implemented for a given game 142-b that may be helpful in providing navigation cues for a user when exploring online or offline multimedia content from a content delivery platform 120. The embodiments are not limited in this context.

A game 142-b may generally combine some form of interactive multimedia content with a set of objectives, rules, challenges and/or interaction. Although a game 142-b may have many different characteristics, one defining characteristic is that a game 142-b is designed for structured playing, entertainment or enjoyment. The game navigation application 130 implements techniques that leverage the entertainment aspects of gaming concepts and applies them towards a navigation framework designed to lead a user to specific content provided by the content delivery platform 120 in an incremental and entertaining manner. For instance, the game navigation application 130 may lead a user from lower value content to higher value content within a gaming context. As a result, the game navigation application 130 provides for an enhanced user experience when navigating content (e.g., online multimedia content) provided by a given content provider (e.g., a website). More particularly, the game navigation framework allows a content provider to steer or direct users toward higher value content embedded within a given content delivery platform 120.

In one embodiment, a game 142-b may be segmented into one or more sub-games, such as game missions. Each mission may have a mission objective designed to lead the user from current multimedia content 122-1 to target multimedia content 122-2 of the content delivery platform 120. In this manner, the game navigation application 130 may control a granularity or incremental amount of user behavior incentives by generating and/or selecting missions and mission objectives for a given game 142-*b* specifically designed to lead to a given target multimedia content 122-2 at a given pace or rhythm while remaining within a same game context or genre of the game 142-*b*. For instance, if a game 142-*b* is designed as an adventure game, the game navigation application 130 may generate and/or select a spy mission, a quest mission, a guild mission, or other types of missions consistent with the adventure genre. In turn, each mission may be broken down further into specific tasks as desired for a given mission, thereby providing an even finer level of granularity and control over user behavior incentives.

The game navigation application 130 may comprise a monitoring component 132. The monitoring component 132 is generally arranged to monitor one or more navigation commands 104 for navigating multimedia content 122-*a* of the content delivery platform 120, and output a game trigger signal 138 based on the navigation commands 104. When a user generates navigation commands 104 to navigate between different types of multimedia content 122-*a* offered by the content delivery platform 120, the monitoring component 132 may monitor and record the navigation commands over a defined sampling period. The monitoring component 132 may passively monitor the content delivery platform 120 by receiving navigation commands sent by the content delivery platform as received from a user (e.g., from an input device or a remote client device). Additionally or alternatively, the monitoring component 132 may actively monitor the content delivery platform 120 to capture the navigation commands 104 as they are received directly from the user. The monitoring component 132 may store the captured navigation commands 104 in a datastore 140.

To issue a game trigger signal 138, the monitoring application 132 may receive a navigation pattern 134-*x* from the game navigation component 136. The game navigation component 136 may select a given navigation pattern 134-*x* from the datastore 140 to selectively set conditions for a game trigger signal 138 based on one or more navigation parameters 146-*y*. Examples of navigation parameters 146-*y* may include without limitation a platform parameter 146-1 associating a particular game 142-*b* with a given content delivery platform 120, a content parameter 146-2 associating a particular game 142-*b* with a given multimedia content 122-*a* of a given content delivery platform 120, a time parameter 146-3 associating a particular game 142-*b* with a given time period a user spends with a given content delivery platform 120 or multimedia content 122-*a* of a given content delivery platform 120, a page count parameter 146-4 associating a particular game 142-*b* with a number of viewed pages of a given content delivery platform 120 or multimedia content 122-*a* of a given content delivery platform 120, a user interface 146-5 parameter associating a particular game 142-*b* with a particular user interface element (e.g., an icon) of multimedia content 122-*a* of a given content delivery platform 120, a navigation command parameter 146-6 associating a particular game 142-*b* with a particular navigation command (e.g., a gesture) used to navigate multimedia content 122-*a* of a given content delivery platform 120, a client device parameter 146-7 associating a particular game 142-*b* with a particular client device (e.g., a smartphone or tablet) used to navigate a given content delivery platform 120 or multimedia content 122-*a* of a given content delivery platform 120, a host device parameter 146-8 associating a particular game 142-*b* with a particular host device (e.g., a server) used to host the content delivery platform 120 or game navigation application 130, a device resource parameter 146-9 associating a particular game 142-*b* with a particular resource of a client device or a host device, a user profile parameter 146-10 associating a particular game 142-*b* with a particular user or user browsing history of the content delivery platform 120 or game navigation application 130, a session parameter 146-11 associating a past or present session with a game 142-*b*, a network parameter 146-12 associating a particular network (e.g., wired, wireless, costs) or network parameters (e.g., speed, latency, bandwidth, network addresses) with a game 142-*b*, and so forth. It may be appreciated that these are merely a few examples of navigation parameters 146-*y* suitable for selecting a given navigation pattern 134-*x*, and other navigation parameters 146-*y* may be used to select other navigation patterns 134-*x* as desired for a given implementation. The embodiments are not limited in this context.

When a user utilizes a device to access the game navigation system 100 and initialize a content browsing session to browse the content delivery platform 120, the game navigation component 136 may begin receiving and evaluating information for one or more navigation parameters 146-*y*. By way of example, assume a client device parameter 146-7 indicates that a client device issuing navigation commands 104 is a desktop computer having an extremely fast video card. Further, assume a network parameter 146-12 indicates that the client device is using a high-speed network. The game navigation system 100 may select a graphics-intensive, fast-paced, first-person shooter action game 142-1 for the content browsing session. By way of contrast, assume the parameters 146-7, 146-12 indicate a smart phone with limited computing resources and a relatively slow network connection. The game navigation system 100 may select a text-based adventure game 142-2 for the content browsing session. It may be appreciated that the number of navigation parameters 146-*y* and potential combinations of navigation parameters 146-*y* may provide a wide selection of potential games 142-*b* suitable for a given content browsing session. The embodiments are not limited in this context.

Once the game navigation component 136 selects a suitable navigation pattern 134-*x*, the game navigation component 136 may forward the selected navigation pattern 134-*x* to the monitoring component 132. The monitoring component 132 may receive the selected navigation pattern 134-*x*, and compare the monitored navigation commands 104 with the selected navigation pattern. The monitoring component 132 may send a game trigger signal 138 to the game navigation component 136 when the monitored navigation commands 104 match the defined navigation pattern.

The game navigation component 136 is generally arranged to receive the game trigger signal 138, and select a game 142-*b* specifically designed to assist a user in navigating the multimedia content 122-*a* in response to the game trigger signal 138. The game navigation component 136 may use, for example, the same parameters used to select the navigation pattern 134-*x*.

The game 142-*b* may have one or more game objectives 144-*c* designed to lead a user from a current multimedia content 122-1 to a target multimedia content 122-2 of the content delivery platform 120. For example, assume a game 142-3 is an adventure game. The game 142-3 may have a game objective 144-1 of registering for a web site. In pursuit of the game objective 144-1, a user needs to locate a game non-player entity (NPE) to engage in conversation and solicit a universal resource locator (URL) of a registration page. The user may then use the URL to navigate from a current multimedia content 122-1 of a "front door" or "landing" web page to a target multimedia content 122-2 of a registration web page in order to perform registration or login operations for the content delivery platform 120 in order to complete the game objective 144-1.

In various embodiments, the multimedia content 122-*a* may have different associated value levels. The term "value" may be a relative term measured using a number of different dimensions, such as revenue associated with different multimedia content 122-*a* (e.g., advertising revenue), a priority level associated with different multimedia content 122-*a* (e.g., product information), content fidelity associated with different multimedia content 122-*a* (e.g., rich content), a temporal constraint associated with different multimedia content 122-*a* (e.g., events with specific dates), a latency associated with different multimedia content 122-*a* (e.g., page load times), specific content provided by the different multimedia content 122-*a* (e.g., specific advertisements, articles, products, etc.), and so forth. The embodiments are not limited to these examples, and any quantifiable dimension may be used as a means for value measurement.

In one embodiment, for example, target multimedia content 122-2 may have a higher value level relative to current multimedia content 122-1. For instance, assume a current multimedia content 122-1 has a first set of advertisements associated with a first revenue number, and a target multimedia content 122-2 has a second set of advertisements associated with a second revenue number, with the second revenue number higher than the first revenue number. The content delivery platform 120 may attempt to drive page views towards the target multimedia content 122-2 in order to capture the increased revenue. In another example, assume a current multimedia content 122-1 has an advertisement for an event occurring on a first date, and a target multimedia content 122-2 has an advertisement for an event occurring on a second date, with the first date occurring after the second date. The content delivery platform 120 may attempt to drive users towards the target multimedia content 122-2 in order to increase event attendance on the second date.

In various embodiments, target multimedia content 122-2 may comprise any type of multimedia content. Examples of multimedia content may include without limitation targeted advertisement, a targeted sponsor, a targeted event, or a targeted feature of the content delivery platform. It may be appreciated that these are merely a few examples of target multimedia content 122-2, and any multimedia content having a measurable value may be used for target multimedia content 122-2.

Figure 1B:
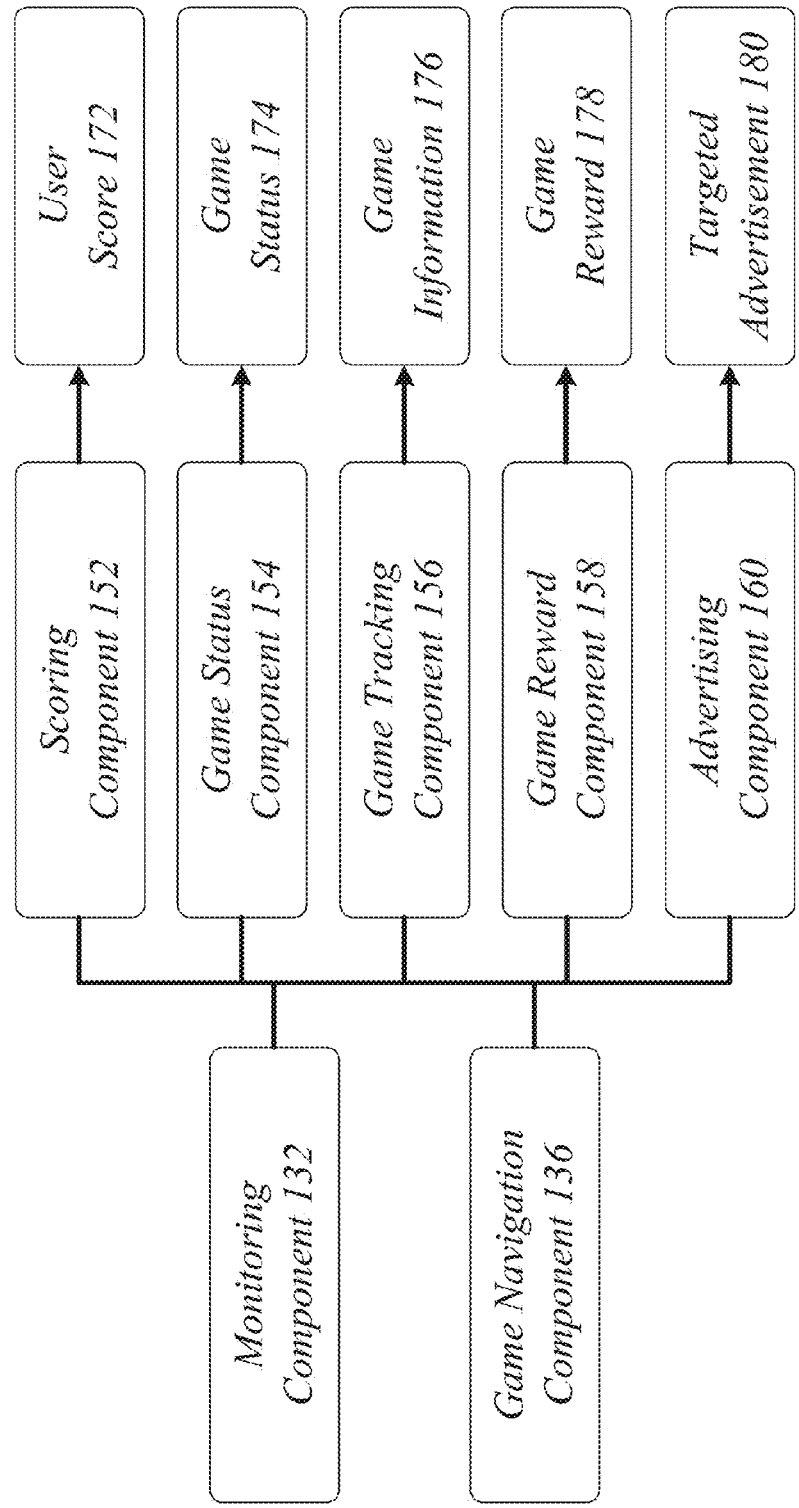
FIG. 1B illustrates an embodiment of a game navigation application for the game navigation system of FIG. 1A.

FIG. 1B illustrates a more detailed block diagram for the game navigation application 130. In one embodiment, the game navigation application 130 may comprise a computer-implemented game navigation application 130 having one or more software applications and/or components. Although the game navigation application 130 shown in FIG. 1B has a limited number of elements in a certain topology, it may be appreciated that the game navigation application 130 may include more or less elements in alternate topologies as desired for a given implementation.

The game navigation application 130 may comprise a scoring component 152. The scoring component 52 may be arranged to generate a user score 172 based on navigation commands 104 or game objectives 144-*c*. The scoring component 152 may use different scoring criteria to accumulate a user score 172 with a particular user. For instance, point values may be assigned to different multimedia content 122-*a*, games 142-*b*, game objectives 144-*c*, content delivery platforms 120, navigation commands 104, user activity, user control directives, user reviews, social networking activity, and so forth. The scoring component 152 may accumulate point values based on select criteria as represented by a user score 172. A user score 172 may then be used to generate awards based on user site behavior, such as award emblems (badges), provide rewards, select games or game objectives, establish user rankings, and so forth. A user score 172 may be presented in a user interface view for multimedia content 122-*a* and/or stored in a user profile associated with a user.

The game navigation application 130 may comprise a game status component 154. The game status component 154 may be arranged to generate a user interface element to present a game status 174 for a game 142-*b*. The game status 174 may represent a current status of a game, game objective, mission, mission objective, and so forth. For instance, the game status 174 may indicate whether a game and/or mission are in an active state or a standby state. The game status 174 may also provide summary information for a game and/or mission (e.g., game and/or mission completion percentage) so that a user can quickly determine whether to resume the game and/or mission.

The game navigation application 130 may comprise a game tracking component 156. The game tracking component 156 may be arranged to generate a user interface element to present game information 176 to give information about a game 142-*b*, including without limitation game tracking information, mission tracking information, recent game activities of other users, tips or help to assist a user in completing a game 142-*b*, and other types of game information. For example, depending on a level of difficulty, and skill of a user, a user may need assistance in completing a game and/or mission. Game information 176 may be presented as part of multimedia content 122-*b* to provide such assistance.

The game navigation application 130 may comprise a game reward component 158. The game reward component 158 may be arranged to generate a game reward 178 when a game 142-*b* has been completed. A game reward 178 may comprise any type of reward typically offered by a game, including emblems (badges), redeemable points, physical prizes, virtual prizes, conference tickets, and so forth. A game reward 178 may be determined, in part, on a user score 172.

The game navigation application 130 may comprise an advertising component 160. The advertising component 160 may be arranged to generate a user interface element to present a targeted advertisement 180 for the target multimedia content 122-2. A targeted advertisement 180 may comprise an advertisement that is particularly relevant to an individual user or class of users (e.g., a demographic). For instance, the advertising component 160 may infer a level of user interest or interaction with a given game 142-*b* based on navigation commands 104, a navigation pattern 134-*x*, a user score 172, a user profile, and similar types of information, and then select a targeted advertisement 180 of a same genre as the game 142-*b*. If the game 142-*b* was a spy game, for example, the advertising component 160 may generated a user interface element with a targeted advertisement 180 for electronic video games in the spy genre.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 2A illustrates one embodiment of a logic flow 200. The logic flow 200 may be representative of some or all of the operations executed by one or more embodiments described herein. For instance, the logic flow 200 may be implemented by the game navigation application 130 of the game navigation system 100.

In the illustrated embodiment shown in FIG. 2A, the logic flow 200 may monitor navigation commands for multimedia content of a content delivery platform at block 202. For example, the monitoring component 132 of the game navigation application 130 may monitor navigation commands 104 for multimedia content 122-a of the content delivery platform 120. The navigation commands 104 may be received from a same or different device implementing the game navigation system 100. An example of the former case may include navigations commands 104 received from a user interface of a computing device implementing an application program as a content delivery platform 120. An example of the latter case may include navigation commands 104 received from a client device implementing a web browser by a server device implementing a website as a content delivery platform 120. The embodiments are not limited to these examples.

The logic flow 200 may select a game for the content delivery platform based on the navigation commands at block 204. For example, the game navigation component 136 of the game navigation application 130 may select a game 142-b from the datastore 140 for the content delivery platform 120 based on the navigation commands 104. The game navigation application 130 may select the game 142-b on a variety of factors, such as based on knowledge of the user (e.g., a user profile) or past behavior of a user (e.g., browsing advertisements or blogs for first-person shooter games), for example. The game navigation application 130 may then select a game 142-b best suited to incentivizing user behavior when navigating various multimedia content 122-a provided by the content delivery platform 120.

The logic flow 200 may select a game objective for the game at block 206. For example, the game navigation component 136 may select a game objective 144-c for the game 142-b. As with game selection, the game navigation component 136 may select one or more game objectives 144-c for the selected game 142-b in order to lead a user to particular multimedia content 122-a offered by the content delivery platform 120. Game objectives 144-c may be selected based on a variety of factors, such as current user behavior (e.g., posting a comment to a particular blog), past user behavior (e.g., completion of a previous game objective), a user score 172 (e.g., higher scores have harder game objectives), a game status 174 (e.g., standby states have easier game objectives while active states have harder game objectives), a targeted advertisement 180, a current multimedia content 122-1, a target multimedia content 122-2, and so forth.

The logic flow 200 may generate content with the game objective for a user interface view for presentation on a display at block 208. For example, assume a game objective 144-1 is score a certain number of points in a sports game, the game navigation component 136 may generate content in the form of a text message string such as "Score four goals in a soccer game against Real Madrid to unlock a secret message" suitable for rendering within a user interface view and presentation on an electronic display of a computing device.

FIG. 2B illustrates one embodiment of a logic flow 210. The logic flow 210 may be representative of some or all of the operations executed by one or more embodiments described herein. For instance, the logic flow 210 may be implemented by the monitoring component 132 and/or the game navigation component 136 of the game navigation application 130 of the game navigation system 100.

In the illustrated embodiment shown in FIG. 2B, the logic flow 210 may monitor navigation commands for multimedia content of a content delivery platform at block 212. As discussed with FIG. 2A, for example, the monitoring component 132 of the game navigation application 130 may monitor navigation commands 104 for multimedia content 122-a of the content delivery platform 120.

The logic flow 210 may compare the monitored navigation commands with a defined navigation pattern at block 214. For example, the game navigation component 136 may select a given navigation pattern 134-x from the datastore 140 to selectively set conditions for a game trigger signal 138 based on received information for one or more navigation parameters 146-y, such as a platform parameter 146-1, a content parameter 146-2, a time parameter 146-3, a page count parameter 146-4, a user interface parameter 146-5, a navigation command parameter 146-6, a client device parameter 146-7, a host device parameter 146-8, a device resource parameter 146-9, a user profile parameter 146-10, a session parameter 146-11, a network parameter 146-12, and other suitable parameters. The game navigation component 136 may send the selected navigation pattern 134-x to the monitoring component 132. The monitoring component 132 may compare the received navigation commands 104 with the selected navigation pattern 134-x, and issue a game trigger signal 138 when a match occurs.

The logic flow 210 may select the game for the content delivery platform when the navigation commands match a defined navigation pattern at block 216. For example, the game navigation component 136 may select a game 142-b for the content delivery platform 120 when received navigation commands 104 match the selected navigation pattern 134-x. In one embodiment, the game navigation component 136 may select a game 142-b associated with the selected navigation pattern 134-x.

FIG. 2C illustrates one embodiment of a logic flow 220. The logic flow 220 may be representative of some or all of the operations executed by one or more embodiments described herein. For instance, the logic flow 220 may be implemented by the monitoring component 132 and/or the game navigation component 136 of the game navigation application 130 of the game navigation system 100.

In the illustrated embodiment shown in FIG. 2C, the logic flow 220 may monitor navigation commands for multimedia content of a content delivery platform at block 222. As discussed with FIG. 2A, for example, the monitoring component 132 of the game navigation application 130 may monitor navigation commands 104 for multimedia content 122-a of the content delivery platform 120.

The logic flow 220 may select a target multimedia content for the content delivery platform based on the navigation commands at block 224. For example, the monitoring component 132 may monitor navigation commands 104 and store the monitored navigation commands 104 in the datastore 140. The game navigation component 136 may analyze the stored navigation commands 104 to infer user interest. Assume a user browses a series of weblog (blog) comments regarding a video game to be released in a few weeks. The game navigation component 136 may select target multimedia content 122-2 comprising an advertisement for a gaming convention where the video game is to be previewed before release.

The logic flow 210 may select the game objective for the game based on a target multimedia content at block 226. For example, the game navigation component 136 may select a game objective 144-c for a game 142-b based on the previously selected target multimedia content 122-2. Continuing with the previous example, the game navigation component 136 may select several questions soliciting a level of video game playing experience from a user as game objectives 144-c, and based on the received answers, may cause a webpage to appear with the gaming convention advertisement.

Figure 2D:
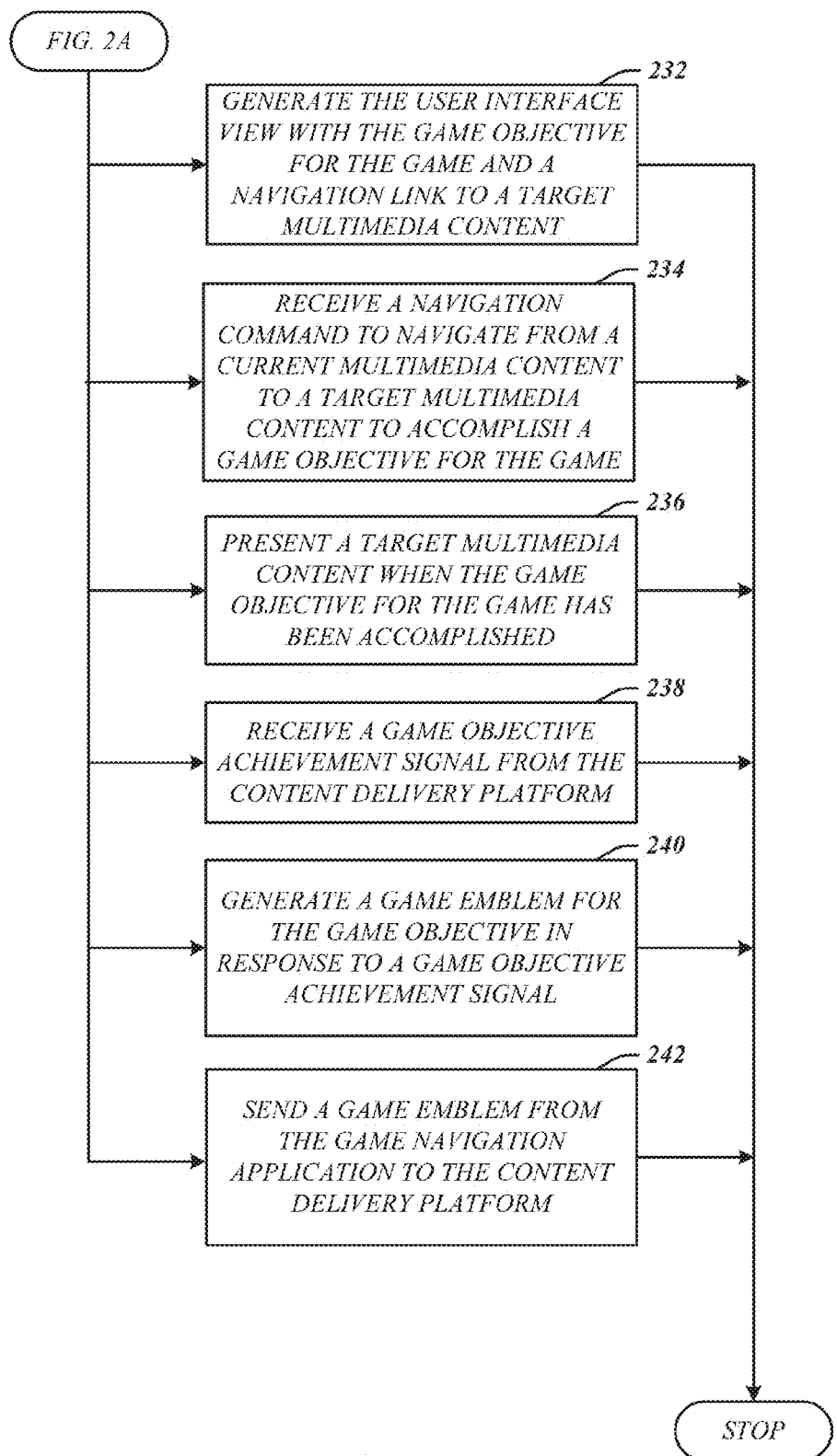
FIG. 2D illustrates an embodiment of a fourth logic flow.

FIG. 2D illustrates one embodiment of a logic flow 230. The logic flow 230 may be representative of some or all of the operations executed by one or more embodiments described herein. For instance, the logic flow 220 may be implemented by the monitoring component 132 and/or the game navigation component 136 of the game navigation application 130 of the game navigation system 100.

In the illustrated embodiment shown in FIG. 2D, the logic flow 230 may generate the user interface view with the game objective for the game and a navigation link to a target multimedia content at block 232. For example, the game navigation component 136 may generate a graphical user interface (GUI) view 106 with a game objective 144-c for a game 142-b and a navigation link (e.g., a hyperlink) to a target multimedia content 122-2.

The logic flow 230 may receive a navigation command to navigate from a current multimedia content to a target multimedia content to accomplish a game objective for the game at block 234. For example, the content delivery platform 120 may receive a navigation command 104 to navigate from a current multimedia content 122-1 (e.g., a current webpage) to a target multimedia content 122-2 (e.g., a different webpage) to accomplish a game objective 144-c for a game 142-b. In other words, the game objective 144-c is specifically designed to lead a user from the current multimedia content 122-1 to the target multimedia content 122-2 as part of game play, thereby incenting user behavior towards the target multimedia content 122-2.

The logic flow 230 may present a target multimedia content when the game objective for the game has been accomplished at block 236. For example, the content delivery platform 120 may present a target multimedia content 122-2 when a game objective 144-c for a game 142-b has been accomplished. The game objective 144-c may cause the user to land on the target multimedia content 122-2 in a course of attempting to reach the game objective 144-c, or the target multimedia content 122-2 or a link to the target multimedia content 122-2 may be produced after the game objective 144-c has been achieved.

The logic flow 230 may receive a game objective achievement signal from the content delivery platform at block 238. For example, once a game objective 144-c has been accomplished, the content delivery platform 120 may generate and send a game objective achievement signal 108 to the game navigation application 130. The game navigation application 130 may receive and store the game objective achievement signal in the datastore 140.

The logic flow 230 may generate a game emblem for the game objective in response to a game objective achievement signal at block 240. For example, the game navigation component 136 may receive a game objective achievement signal 108 from the content delivery platform 120 or the datastore 140, and generate a game emblem 110 for accomplishing the game objective 144-c associated with the game objective achievement signal 108.

The logic flow 230 may send a game emblem from the game navigation application to the content delivery platform at block 242. For example, the game navigation component 136 of the game navigation application 130 may send a game emblem 110 to the content delivery platform 120. The content delivery platform 120 may store the game emblem 110 with a user profile, and present the game emblem with other user information in a user interface view of the user profile.

Figure 3:
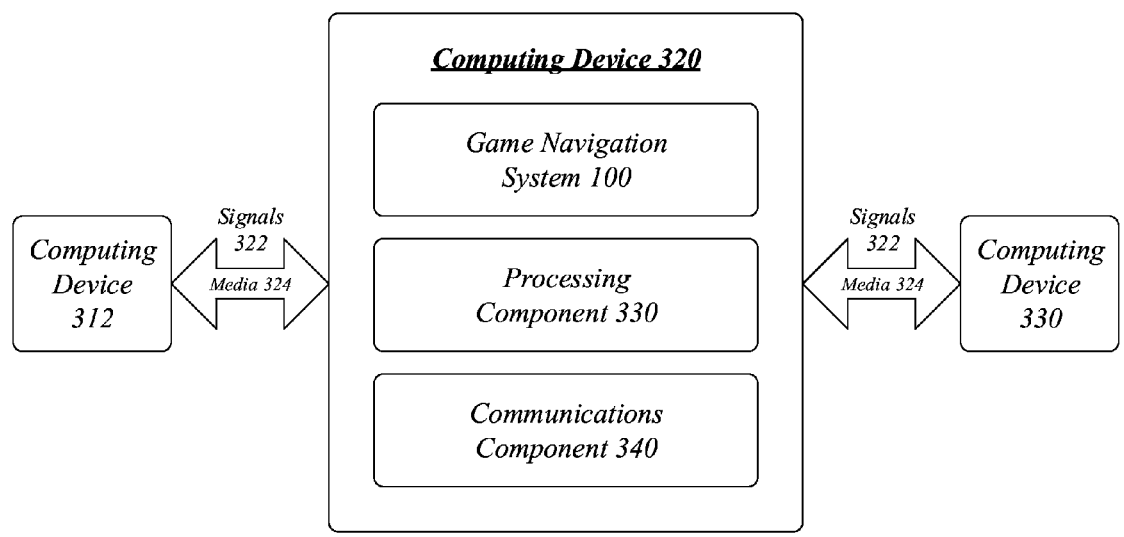
FIG. 3 illustrates an embodiment of a centralized system.

FIG. 3 illustrates a block diagram of a centralized system 300. The centralized system 300 may implement some or all of the structure and/or operations for the game navigation system 100 in a single computing entity, such as entirely within a single computing device 320.

The computing device 320 may execute processing operations or logic for the game navigation system 100 using a processing component 330. The processing component 330 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 320 may execute communications operations or logic for the game navigation system 100 using communications component 340. The communications component 340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 324 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 324.

The computing device 320 may communicate with other computing devices 312, 330 over a communications media 324 using communications signals 322 via the communications component 340. The other computing devices 312, 330 may comprise, for example, game servers, content servers, network storage servers, social media servers, enterprise servers, security servers, communications servers, and other network devices having data, resources, applications or services needed by the computing device 320 and/or the game navigation system 100. For instance, rather than retrieving games 142-b from the datastore 140 implemented with the game navigation application 130, the game navigation application 130 may use games 142-b stored by the computing device 312 implemented as a game server. In this manner, games 142-b and game content for games 142-b may be updated in a central server and retrieved from various implementations of the game navigation application 130 of the game navigation system 100. In another example, rather than limiting a target multimedia content 122-2 from the content delivery platform 120, the content delivery platform 120 and/or the game navigation application 130 may select, retrieve and/or present target multimedia content 122-2 from the computing device 330 implemented as a social media server. In this manner, a user may be led to a sponsor page for a product implemented by the social media server, with the sponsor page having advertisements, discussion groups, product information, and similar related information. The embodiments are not limited in this context.

Figure 4:
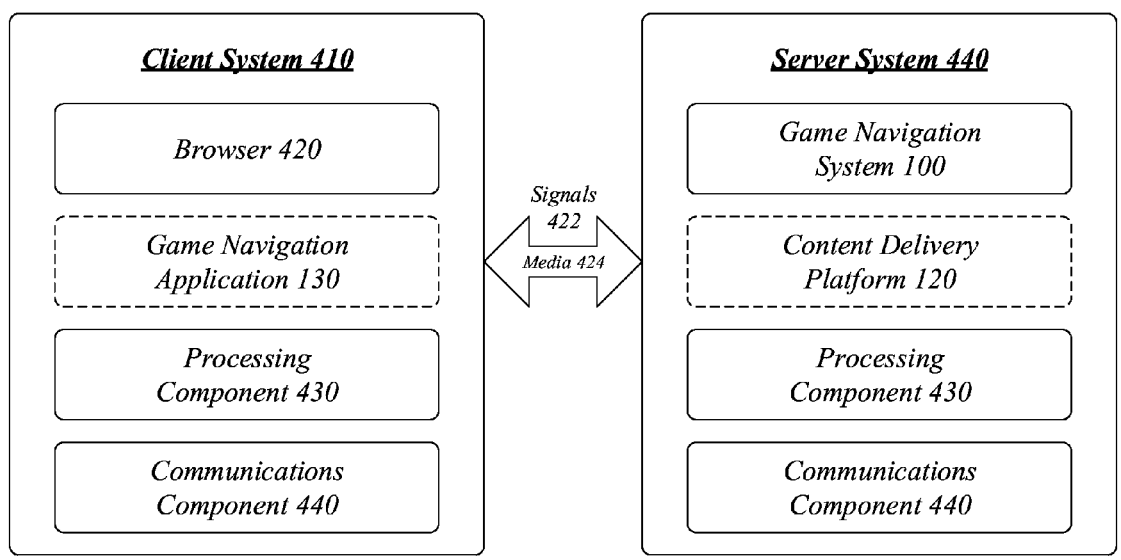
FIG. 4 illustrates an embodiment of a distributed system.

FIG. 4 illustrates a block diagram of a distributed system 400. The distributed system 400 may distribute portions of the structure and/or operations for the game navigation system across multiple computing entities. Examples of distributed system 400 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, for example, the distributed system 400 may be implemented as a client-server system. For instance, the distributed system 400 may comprise a client system 410 and a server system 440. The systems 410, 440 may process information using the processing components 430, which are similar to the processing component 330 described with reference to FIG. 3. The systems 410, 430 may communicate with each over a communications media 420 using communications signals 422 via communications components 440, which are similar to the communications component 340 described with reference to FIG. 3.

In various embodiments, the client system 410 may comprise or employ one or more client computing devices and/or client programs that operate to perform various methodologies in accordance with the described embodiments. As shown in FIG. 4, the client system 410 may implement a web browser 420. The client system 410 may optionally implement portions of the game navigation system 100 as well, such as the game navigation application 130 of the game navigation system 100, for example.

In various embodiments, the server system 440 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server system 440 may include, for example, stand-alone and enterprise-class server computers operating a server OS such as a MICROSOFT® OS, a UNIX® OS, a LINUX® OS, or other suitable server-based OS. Exemplary server programs may include, for example, communications server programs for managing incoming and outgoing messages, messaging server programs for providing unified messaging (UM) for e-mail, voicemail, VoIP, instant messaging (IM), group IM, enhanced presence, and audio-video conferencing, and/or other types of programs, applications, or services in accordance with the described embodiments.

In the embodiment shown in FIG. 4, the server system 440 may implement a complete version of the game navigation system 100. The server system 440 may optionally implement portions of the game navigation system 100 as well, such as the content delivery platform 120 of the game navigation system 100, for example.

In one embodiment, the client system 410 may access the game navigation system 100 implemented by the server system 440. For instance, a user may use the web browser 420 of the client system 410 to access the game navigation system 100 via one or more web technologies, such as various web services, for example. The user may access one or more web pages available from the content delivery platform 120 of the game navigation system 100 by sending navigation commands 104 from the client system 410 over communications media 424 as communications signals 422 via communications components 440. The game navigation system 100 may receive the navigation commands 104, and output various games 142-b and game objectives 144-c to guide users to specific multimedia content 122-a hosted by the content delivery platform 120. The game navigation system 100 may send multimedia content 122-a, such as current multimedia content 122-1 having user interface views such as GUI view 106 with game information, from the server system 440 over communications media 424 as communications signals 422 via communications components 440. The content delivery platform 120 may also send multimedia content 122-a, such as target multimedia content 122-2, from the server system 440 over communications media 424 as communications signals 422 via communications components 440.

In one embodiment, the client system 410 may implement parts of the game navigation system 100, such as the optional game navigation application 130. The client system 410 may utilize the web browser 420 to access a content delivery platform 120 implemented by the server system 440. The user may access one or more web pages available from the content delivery platform 120 by sending navigation commands 104 from the client system 410 over communications media 424 as communications signals 422 via communications components 440. The content delivery platform 120 may also send multimedia content 122-a, such as current multimedia content 122-1 and target multimedia content 122-2, from the server system 440 over communications media 424 as communications signals 422 via communications components 440. However, user interface views such as GUI view 106 with game information is generated by a client version of the game navigation application 130, and either overlaid on top of multimedia content 122-a or presented in a separate browser window.

Figure 5A:
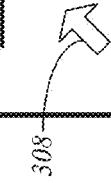
FIG. 5A illustrates an embodiment of a first user interface view.

FIG. 5A illustrates an embodiment of a user interface view 500. The user interface view 500 illustrates an embodiment where the content delivery platform 120 is implemented as a website, and the multimedia content 122-a is implemented as one or more web pages. As shown in FIG. 5A, the multimedia content 122-a may include a current multimedia content 122-1 comprising a web page 502. The web page 502 may comprise, for example, a landing page or home page for the website. The web page 502 may include various user interface elements designated as web parts 504-d. A user may select various web parts 504-d using any number of input devices, such as by manipulating a pointer interface 308 or a gesture interface 310, for example.

Figure 5B:
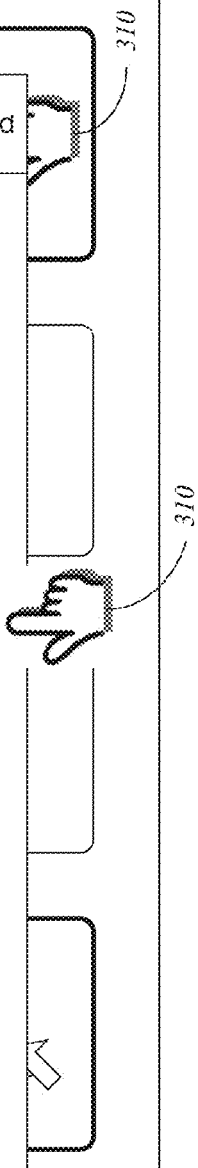
FIG. 5B illustrates an embodiment of a second user interface view.

FIG. 5B illustrates an embodiment of a user interface view 510. The user interface view 510 is similar to the user interface view 500. However, a GUI view 106 has been overlaid on top of the web page 502. Assume a user selects various web parts 504-d as indicated by interfaces 308, 310 during a browsing session. At some point during the browsing session, the monitoring component 132 matches a navigation pattern 134-x, and the game navigation application 136 initiates an adventure game 142-1. The game navigation application 136 selects a game objective 144-1 comprising registering the user with the content delivery platform 120. The game navigation 136 generates a GUI view 106 with a game objective 144-1 presented as a text string implying that the user is taking the persona of a game player looking for a mission. The GUI view 106 may be created in a manner similar to typical adventure games to entice the user to join the game. The GUI view 106 may further include a hyperlink presented as underlined and bolded text "registering here." If a user decides to join the game, the user may select the hyperlink to leave the current multimedia content 122-1.

Although the GUI view 106 is shown in FIG. 5B as a solid GUI element which hides a portion of the web page 502, it may be appreciated that GUI view 106 may have varying degrees of translucency to allow viewing of the underlying web page 502. The embodiments are not limited in this context.

Figure 5C:
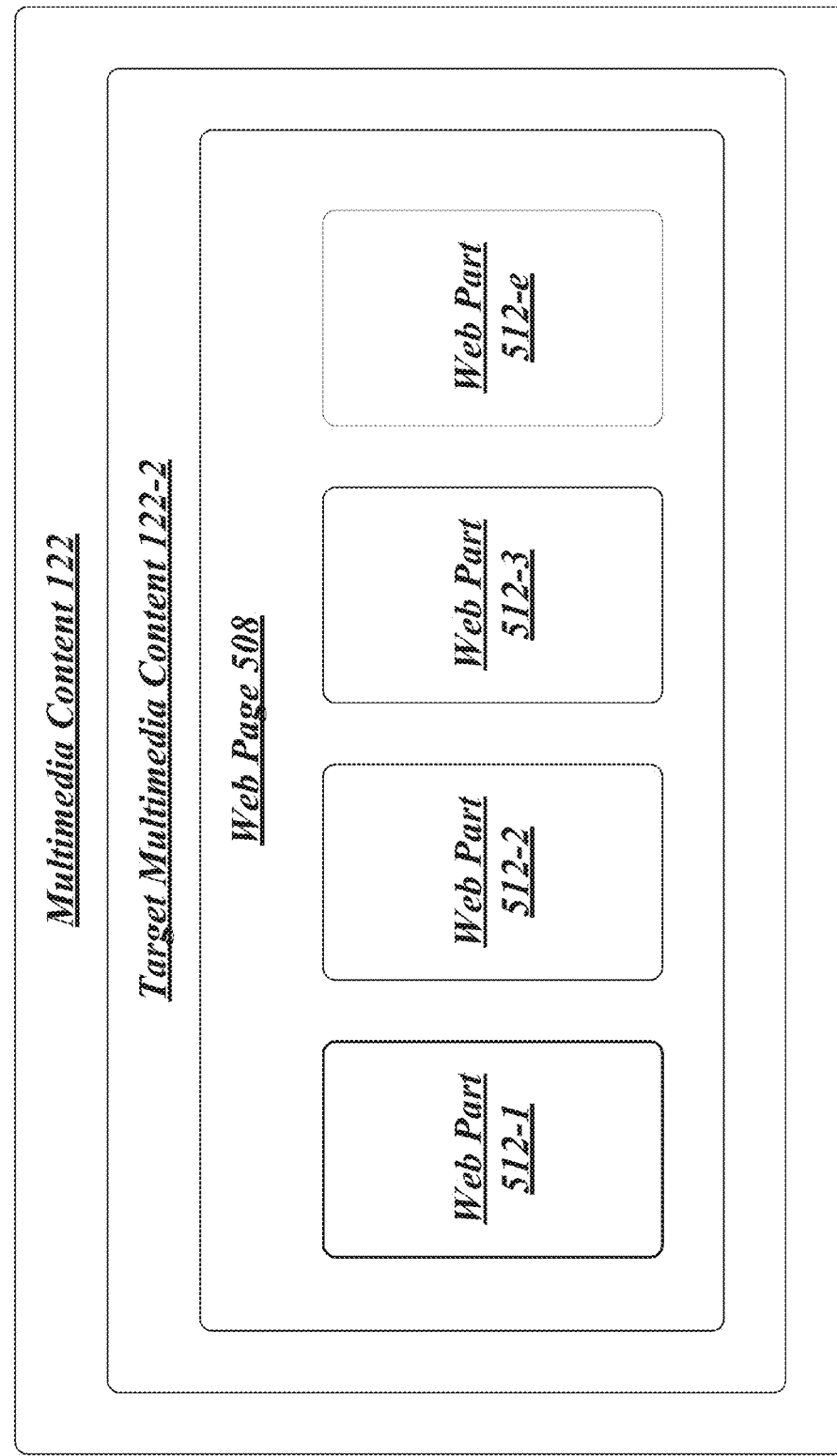
FIG. 5C illustrates an embodiment of a third user interface view.

FIG. 5C illustrates an embodiment of a user interface view 520. The user interface view 520 an embodiment where the content delivery platform 120 serves a target multimedia content 122-2 comprising a web page 508. The web page 508 may comprise, for example, a registration or login page for the website. The web page 508 may include various user interface elements designated as web parts 512-e. A user may select various web parts 512-e using any number of input devices in order to complete registration operations for the content delivery platform 120, and thereby completing the game objective 144-1.

Figure 6:
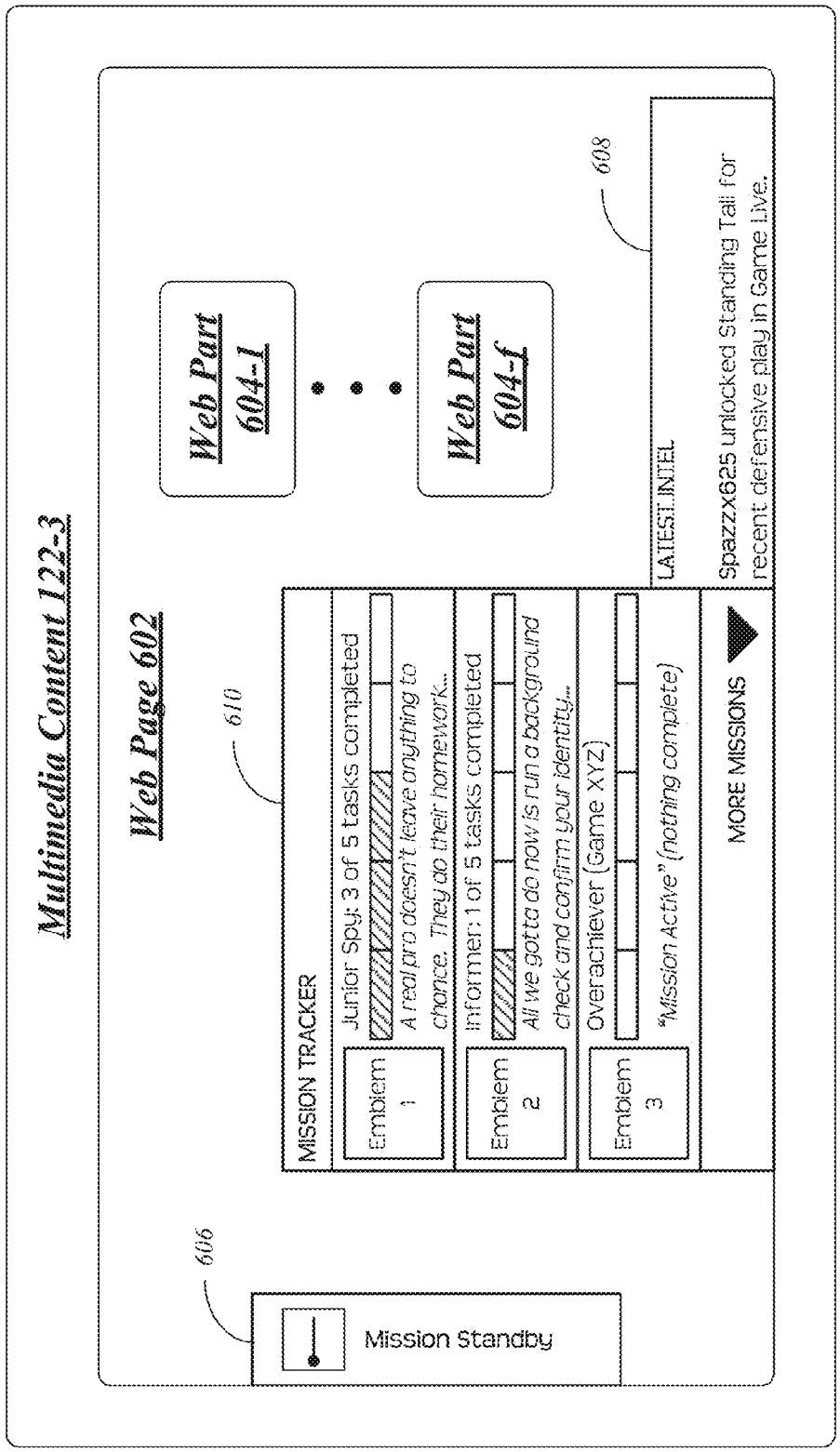
FIG. 6 illustrates an embodiment of a fourth user interface view.

FIG. 6 illustrates an embodiment of a user interface view 600. The user interface view 600 illustrates an embodiment where the content delivery platform 120 is implemented as a website. As shown in FIG. 6, multimedia content 122-3 may comprise a web page 602. The web page 600 may comprise, for example, any given web page for the website. The web page 600 may include various user interface elements designated as web parts 604-f. A user may select various web parts 604-f using any number of input devices, such as by manipulating a pointer interface 308 or a gesture interface 310 as shown in FIG. 5A.

In addition to various web parts 604-f, the web page 600 may include a number of GUI elements having game information. For instance, a GUI element 606 may include a game status 174 for a game 142-b as generated by the game status component 154. In another example, a GUI element 608 may include game information 176 for a game 142-b comprising game activities of another user "Spazzx625" as generated by the game tracking component 156. In yet another example, a GUI element 610 may include game information 176 for a game 142-b comprising a mission tracker of various missions, which includes a number of completed tasks and a text string with information about a next task for each mission.

Figure 7:
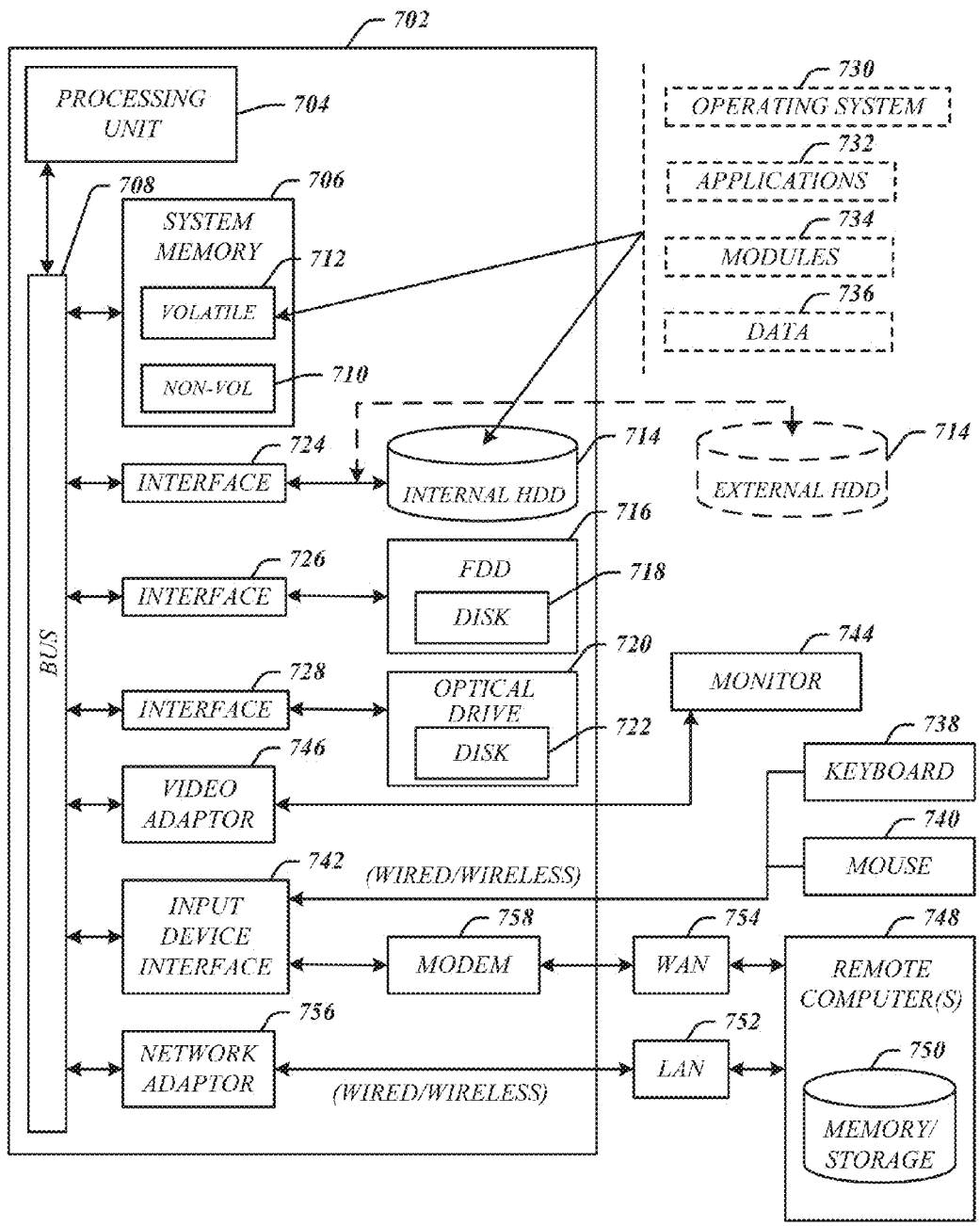
FIG. 7 illustrates an embodiment of a computing architecture.

FIG. 7 illustrates an embodiment of an exemplary computing architecture 700 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 700 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736.

The one or more application programs 732, other program modules 734, and program data 736 can include, for example, the game navigation system 100, the content delivery platform 120, the game navigation application 130, the monitoring component 132, the game navigation component 136, the scoring component 152, the game status component 154, the game tracking component 156, the game reward component 158, the advertising component 160, and the web browser 420.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
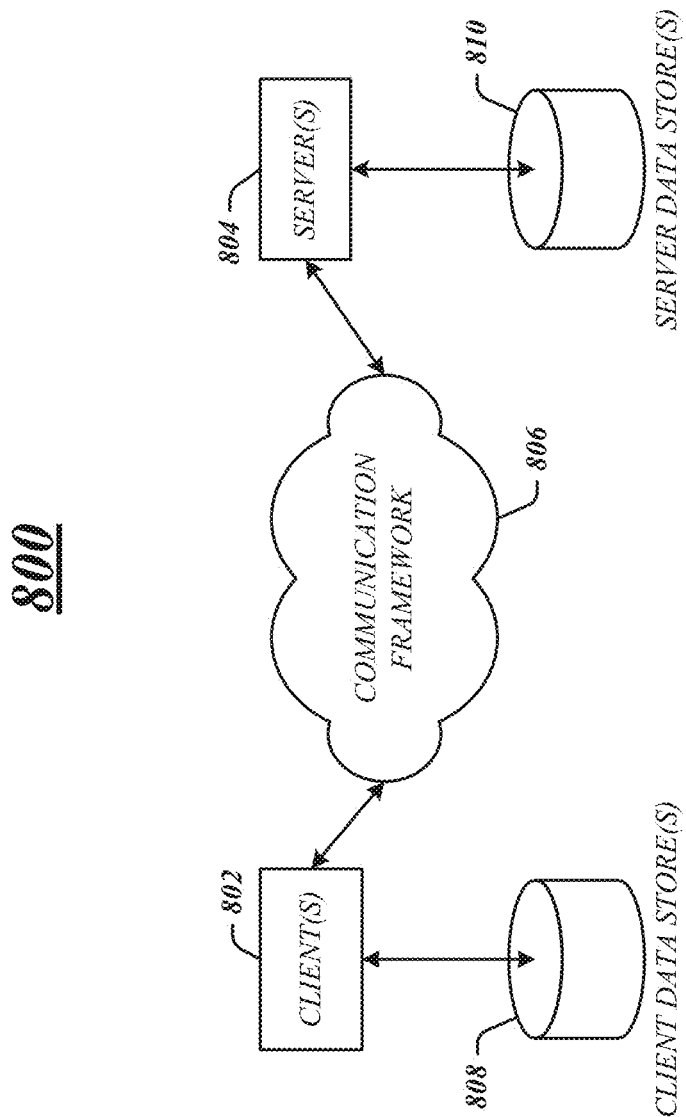
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client systems 320, 410. The servers 804 may implement the server system 440. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols, such as those described with reference to systems 300, 400 and 700. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described as comprising one or more elements. For instance, some elements may have labels containing variables such as "a" and "b" and "c" and similar designators. It is worthy to note that such designators are intended to be variables representing any positive integer. Thus, for example, if an implementation sets a value for a=5, then a complete set of elements 101-a may include elements 101-1, 101-2, 101-3, 101-4 and 101-5. The embodiments are not limited in this context.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented system, comprising:
a processor;
a content delivery platform operative on the processor to manage and provide multimedia content; and
a game navigation application operative on the processor to manage a game for the content delivery platform, the game navigation application comprising a game navigation component, a monitoring component, and a game tracking component:
the game navigation component operative to receive information for a navigation parameter about a client device, the navigation parameter comprising at least one of a client device parameter and a network parameter, select a navigation pattern based on the received information for the navigation parameter, the navigation pattern comprising one or more expected navigation commands, navigation pattern associated with a game, receive a game trigger signal, select the game associated with the selected navigation pattern, the game arranged to assist a user in navigating the multimedia content, in response to the game trigger signal the game having a game objective arranged to lead a user from current multimedia content to target multimedia content of the content delivery platform;
the monitoring component operative to monitor navigation commands issued by the client device for navigating multimedia content provided by the content delivery platform, receive the navigation pattern from the game navigation component and compare the navigation commands to the received navigation pattern, and output a game trigger signal to the game navigation component when the navigation commands match the selected navigation pattern; and
the game tracking component operative to generate a user interface element to present game information to assist a user in completing the selected game.

2. The computer-implemented system of claim 1, the game having one or more missions, each mission having a mission objective designed to lead the user from current multimedia content to target multimedia content of the content delivery platform.

3. The computer-implemented system of claim 1, the multimedia content having different associated value levels, with the target multimedia content having a higher value level relative to the current multimedia content.

4. The computer-implemented system of claim 1, the target multimedia content comprising a targeted advertisement, a targeted sponsor, a targeted event, or a targeted feature of the content delivery platform.

5. The computer-implemented system of claim 1, the game navigation application further comprising a scoring component operative to generate a user score based on navigation commands or game objectives.

6. The computer-implemented system of claim 1, the game navigation application further comprising a game status component operative to generate a user interface element to present a game status for the game.

7. The computer-implemented system of claim 1, the game navigation application further comprising a game reward component operative to generate a game reward when the game has been completed.

8. The computer-implemented system of claim 1, the game navigation application further comprising an advertising component operative to generate an advertising user interface element to present a targeted advertisement for the target multimedia content.

9. A computer-implemented method, comprising:
receiving information for a navigation parameter about a client device, the navigation parameter comprising at least one of a client device parameter and a network parameter;
selecting a navigation pattern based on the received information for the navigation parameter, the navigation pattern comprising a set of one or more expected navigation commands, the navigation pattern associated with a game;
monitoring navigation commands issued by the client device for multimedia content provided by a content delivery platform;
comparing the navigation commands to the selected navigation pattern;
when the navigation commands match the selected navigation pattern:
selecting the game associated with the selected navigation pattern, the game having a game objective arranged to lead a user from the current multimedia content to target multimedia content on the content delivery platform;
selecting a game objective for the game; and
generating multimedia content with the game objective and sending a user interface view of the generated multimedia content to the client device for presentation on a display, the generated multimedia content assisting the user in completing the game objective.

10. The computer-implemented method of claim 9, further comprising selecting the target multimedia content for the content delivery platform based on the navigation commands.

11. The computer-implemented method of claim 9, further comprising selecting the game objective for the game based on the target multimedia content.

12. The computer-implemented method of claim 9, comprising wherein generating presenting the user interface view with the game objective for the game includes presenting and a navigation link to the target multimedia content.

13. The computer-implemented method of claim 9, further comprising receiving a navigation command to navigate from the current multimedia content to the target multimedia content to accomplish the game objective for the game.

14. The computer-implemented method of claim 9, further comprising presenting the target multimedia content when the game objective for the game has been accomplished.

15. The computer-implemented method of claim 9, further comprising receiving a game objective achievement signal from the content delivery platform.

16. The computer-implemented method of claim 9, further comprising generating a game emblem for the game objective in response to a game objective achievement signal.

17. The computer-implemented method of claim 9, further comprising sending a game emblem from the game navigation application to the content delivery platform.

18. A computer-implemented system, comprising:
a game server comprising one or more processors,
a content server comprising one or more processors;
a content delivery platform and a game navigation application, the content delivery platform operative on the content server to present one or more web pages for a web site, and the game navigation application operative on the game server to manage a plurality of games of different genres for the content delivery platform, the game navigation application comprising:
a game navigation component operative to receive information for a navigation parameter about a client device, the navigation parameter comprising at least one of a client device parameter and a network parameter, select a navigation pattern based on the received information for the navigation parameter, the navigation pattern comprising one or more expected navigation commands, receive a game trigger signal, and generate a game specifically designed to assist a user in navigating the web site in response to the game trigger signal, the game having a game objective arranged to lead a user from a current web page to a target web page of the web site; and
a monitoring component operative to monitor navigation commands issued by the client device for the one or more web pages of the web site, receive the navigation pattern from the game navigation component, compare the navigation commands to the received navigation pattern, and output a game trigger signal game navigation component when the navigation commands match the selected navigation pattern.

19. The computer-implemented system of claim 18, the one or more web pages having different associated value levels, with the target web page having a higher value level relative to the current web page.

20. The computer-implemented system of claim 18, the target web page having targeted content, including a targeted advertisement, a targeted sponsor, a targeted event, or a targeted feature of the web site content delivery platform.

21. The computer-implemented system of claim 18, the game navigation application further comprising a mission component operative to generate a mission for the game, the mission having a mission objective designed to lead a user to the target web page of the web site.

22. The computer-implemented system of claim 18, the game navigation application further comprising a scoring component operative to generate a user score based on navigation commands, game objectives, or mission objectives.

23. An article comprising a non-transitory computer-readable storage medium containing instructions that when executed enable a processor-based system to:
receive information for a navigation parameter about a client device, the navigation parameter comprising at least one of a client device parameter and a network parameter;
select a navigation pattern based on the received information for the navigation parameter, the navigation pattern comprising a set of one or more expected navigation commands the navigation pattern associated with a game;
monitor navigation commands issued by the client device for one or more web pages for a web site;
compare the navigation commands to the selected navigation pattern;
when the navigation commands match the selected navigation pattern:

select the game associated with the selected navigation pattern, the selected game having a game objective arranged to lead a user to navigate from a current web page to a target web page of the web site;

select a game objective for the game; and generate content with the game objective for a user interface view for presentation on a display.

24. The article of claim 23, further comprising instructions that when executed enable the system to present a user score based on navigation commands or game objectives.

25. The article of claim 23, further comprising instructions that when executed enable the system to present a user interface view with a game status for the game.

26. The article of claim 23, further comprising instructions that when executed enable the system to present a user interface view with game hint information to assist a user in completing the game or the game objective.

27. The article of claim 23, further comprising instructions that when executed enable the system to present a game emblem when the game is complete.

* * * * *